United States Patent [19]

Smith et al.

[11] 4,417,766
[45] Nov. 29, 1983

[54] WIRE SPOKE VEHICLE WHEEL AND METHOD OF MANUFACTURE

[75] Inventors: Richard W. Smith, Lansing; William J. Waugaman, Grosse Pointe Farms, both of Mich.

[73] Assignee: Motor Wheel Corporation, Lansing, Mich.

[21] Appl. No.: 300,890

[22] Filed: Sep. 10, 1981

[51] Int. Cl.³ .............................................. B60B 1/02
[52] U.S. Cl. .................................. 301/55; 29/159.02
[58] Field of Search ........................ 301/9 SB, 54–59, 301/67–73, 95–97; 29/159.1, 159.02, 159.03

[56] References Cited

U.S. PATENT DOCUMENTS

| | | | |
|---|---|---|---|
| 1,963,230 | 6/1934 | Eksergian | 301/59 |
| 1,969,108 | 8/1934 | Tarbox | 301/57 |
| 3,099,490 | 7/1963 | Ellison | 29/159.03 |
| 4,088,372 | 5/1978 | Jewett et al. | 301/97 |
| 4,275,931 | 6/1981 | Ruppert | 301/37 R |
| 4,345,795 | 8/1982 | Schardt | 301/59 |

*Primary Examiner*—H. Grant Skaggs

*Attorney, Agent, or Firm*—Barnes, Kisselle, Raisch, Choate, Whittemore & Hulbert

[57] ABSTRACT

A wire spoke vehicle wheel and method of assembly wherein the wheel rim comprises separate rim segments permanently joined to each other preferably in a friction welding operation. The outboard rim segment includes at least a first portion which cooperates with the inboard rim segment to function as an outboard rim bead retaining flange, and a second portion which extends radially inwardly therefrom. A hub, which includes openings for mounting to a vehicle axle spindle, is centrally mounted within the rim by a circumferential array of wire spokes extending between the hub and the inwardly extending portion of the second rim segment. In preferred embodiments of the invention, the second rim segment is friction welded to the first rim segment outboardly adjacent the outboard bead seat which forms a part of the first rim segment, and the centrally mounting hub is carried generally radially inwardly of the outboard bead seat so as to provide clearance beneath the rim base for a disc brake package, such that the preferred embodiments of the wheel are adapted for use on conventional front wheel drive vehicles.

12 Claims, 6 Drawing Figures

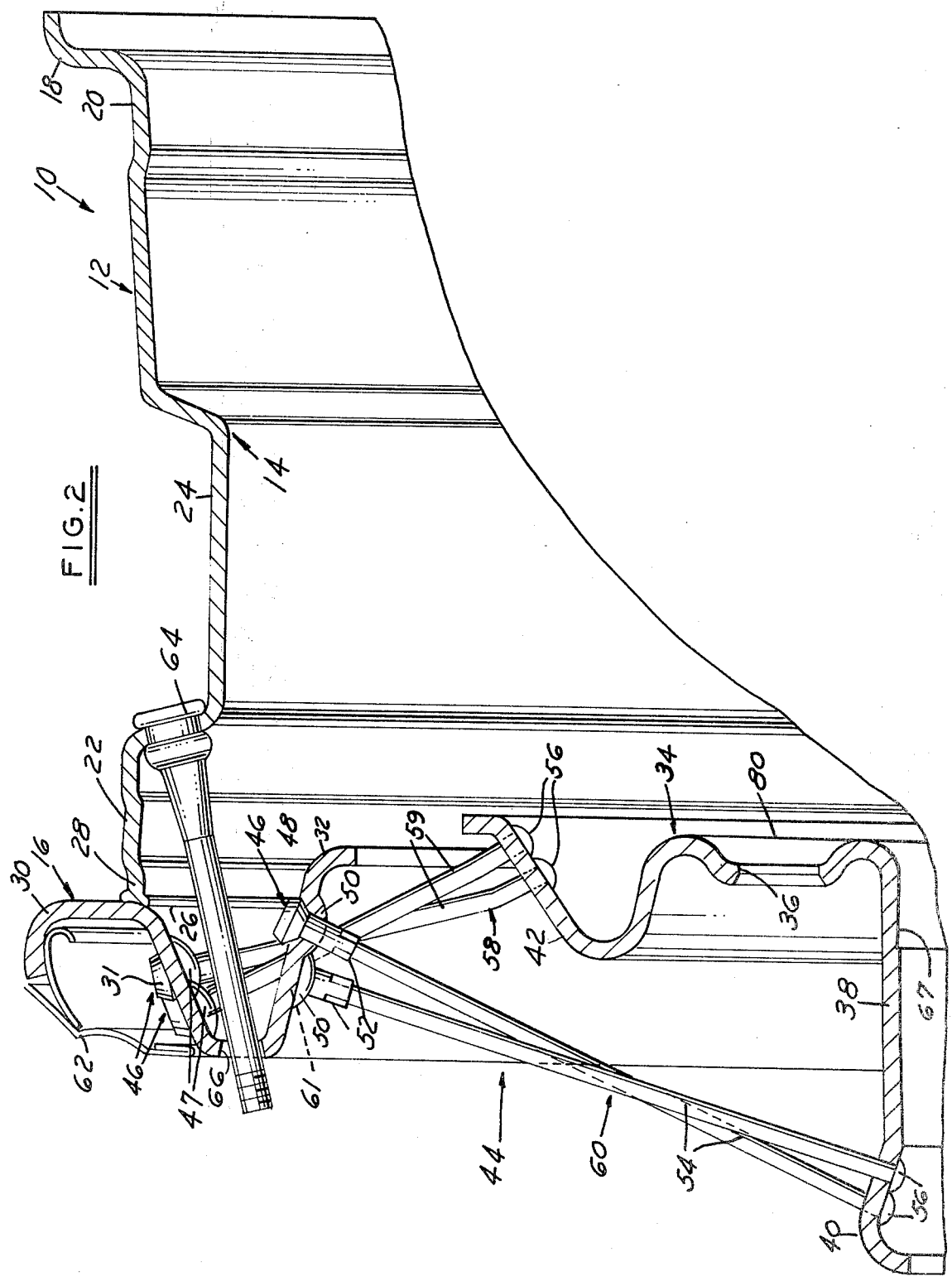

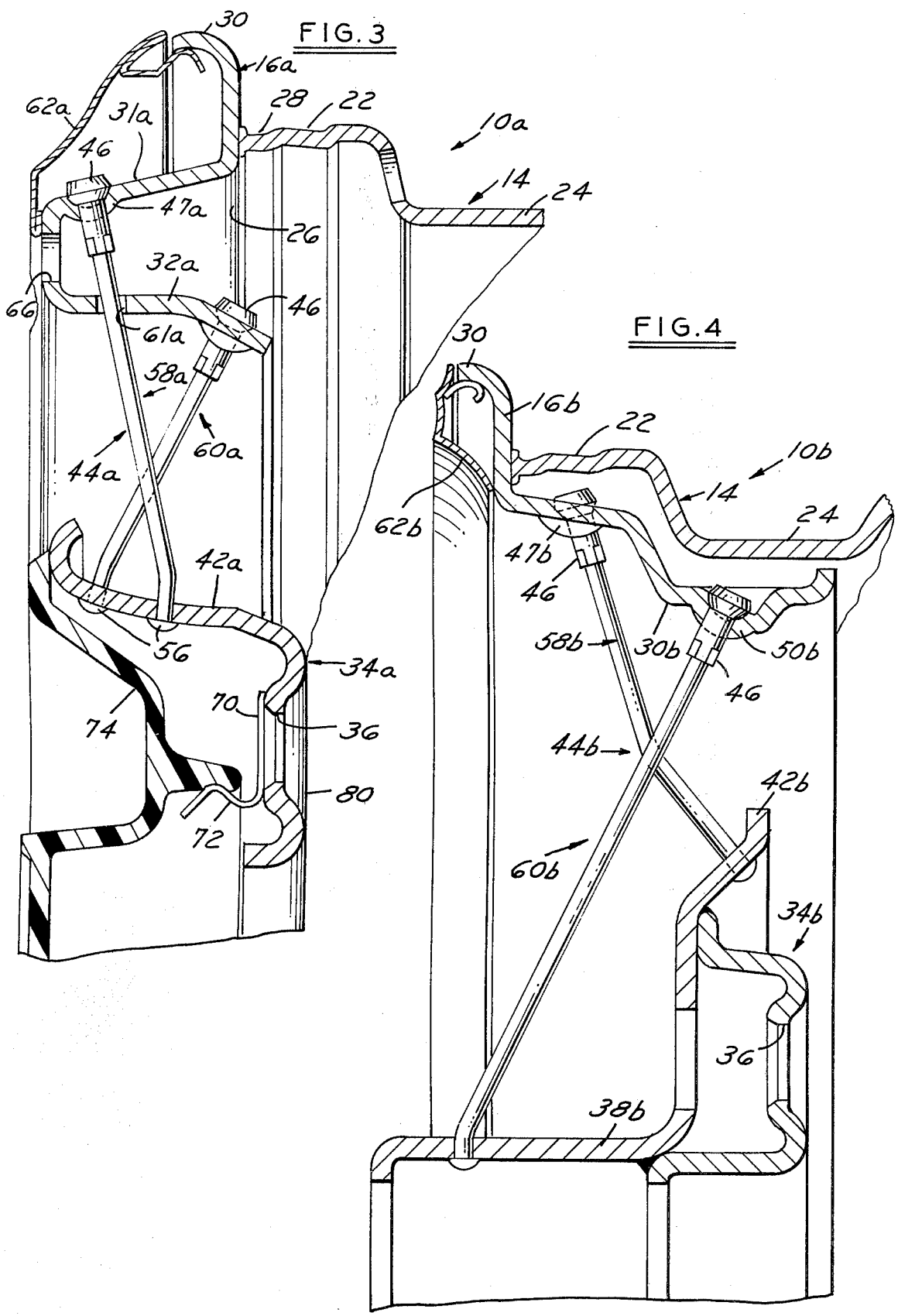

WIRE SPOKE VEHICLE WHEEL AND METHOD OF MANUFACTURE

The present invention is directed to vehicle wheels, and particularly to wire spoke vehicle wheels and methods of manufacturing such wheels for passenger-type automotive vehicles.

Increased emphasis is now being placed upon ornamental styling of vehicle wheels, particularly in the passenger car market. A wheel style of particular interest is that which provides a wire spoke wheel configuration. One approach for achieving wire spoke styling is to simulate a wire wheel structure in a wheel cover assembly. Such wheel covers are expensive and highly subject to theft. A second approach has been to incorporate wire spokes into a conventional disc wheel assembly wherein the wire spokes perform no substantial load-bearing function. Although ornamental wheels of the latter type may be styled closely to simulate a true wire spoke wheel in appearance, this design concept is not readily adaptable for use in popular front wheel drive vehicles wherein the mounting surface on the vehicle axle spindle is disposed generally radially inwardly of the outboard wheel bead seat to provide clearance beneath the wheel rim base for a disc brake package.

A third approach exemplified in U.S. Pat. No. 3,993,357 has been to replace the stamped steel disc of a typical passenger car wheel with a wire spoke disc assembly in which the wire spokes support the vehicle load. U.S. Pat. No. 4,275,931 shows a similar wire spoke wheel adapted for use on a front wheel drive vehicle. The present invention is in the field of true wire spoke wheels of these types.

An object of the present invention is to provide a wire spoke wheel of the above-described type, and a method for manufacturing the same, which is economical in manufacture and which may be readily repaired by trained service personnel.

Another important object of the invention is to provide a wire spoke wheel and method of manufacture capable of achieving and adapted to achieve wheel concentricity and balance tolerances on the same order as those achievable in conventional disc wheels utilizing currently available technology.

A further object of the invention is to provide an improved wire spoke vehicle wheel adapted for use on front wheel drive vehicles, and to provide a method of manufacturing such wheel to concentricity and balance tolerances previously mentioned.

The invention, together with additional objects, features and advantages thereof, will be best understood from the following description, the appended claims and the accompanying drawings in which:

FIG. 2 is a fragmentary sectional view of the wheel illustrated in FIG. 1 taken substantially along the line 2—2 in FIG. 1; and FIGS. 3-6 are fragmentary sectional views similar to FIG. 2 illustrating respective alternative embodiments of the wheel provided in accordance with the present invention.

In the following description and claims, directional adjectives such as "inboard" and "outboard" are intended to have their usual meanings in the art taken with reference to the intended orientation of mounting the various wheels on a vehicle axle spindle.

Figure 1:
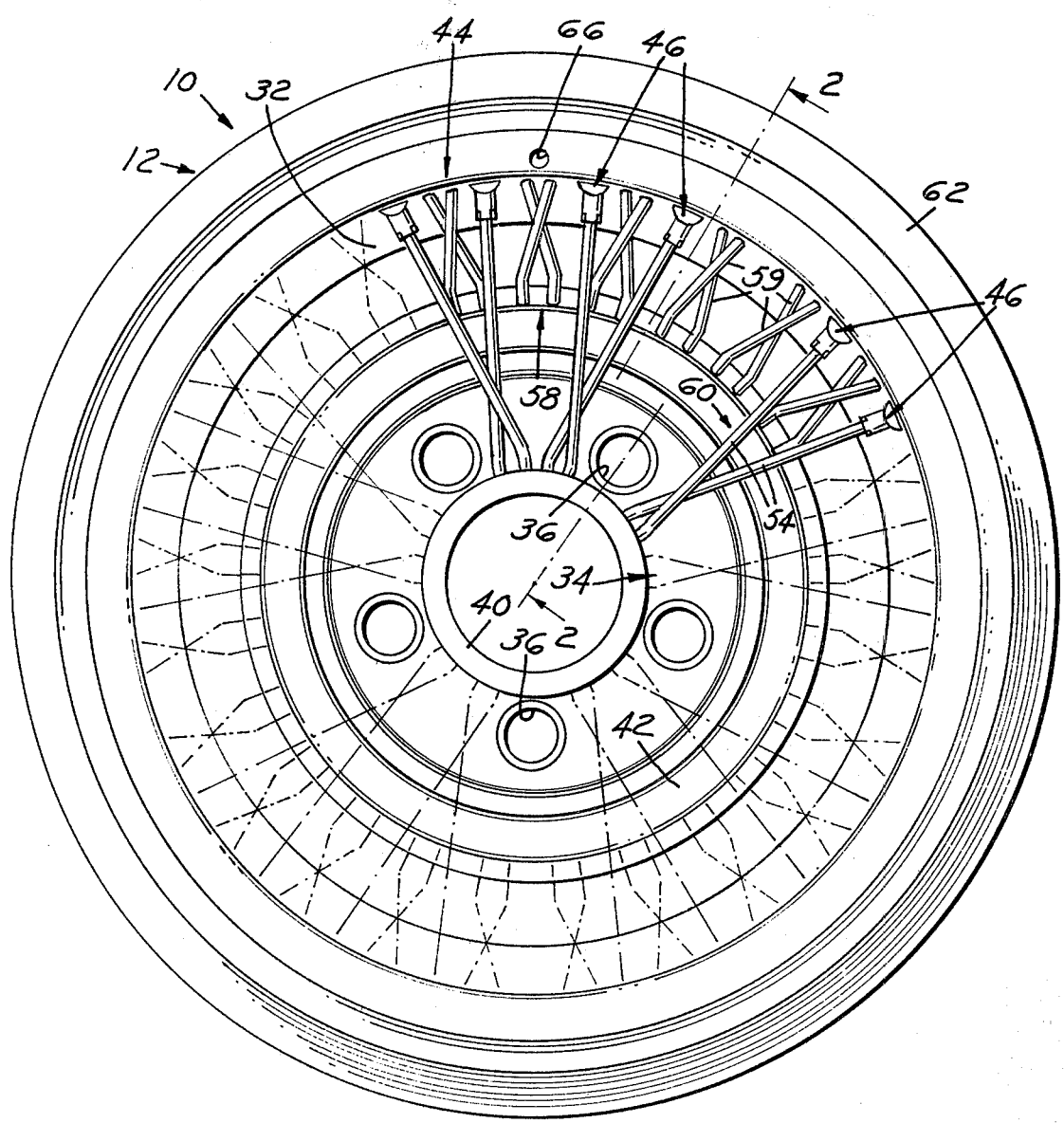
FIG. 1 is a front elevational view of one embodiment of a wire spoke vehicle wheel in accordance with the present invention.

Referring to FIGS. 1 and 2, the wheel 10 in accordance with the invention illustrated therein includes a tire receiving rim 12 comprising a first rim segment 14 and a separate second rim segment 16 permanently affixed to rim segment 14. In the embodiment of FIGS. 1 and 2, rim segment 14 includes an inboard tire bead retaining flange 18 and a rim base extending axially outwardly of flange 14 to form a pair of axially spaced tire bead seats 20,22. Bead seats 20,22 are separated by a rim drop center or well 24. The radially outer surface of bead seat 20 and the major portion of the outer surface of bead seat 22 are angulated outwardly at 5° to the wheel axis in the usual manner. Immediately adjacent the outboard or flange-remote axial edge 26 of rim segment 14, bead seat 22 is depressed radially inwardly to form a circumferentially continuous band 28 at reduced radius with respect to the adjacent angulated portion of bead seat 22 for a purpose to be described hereinafter.

Rim segment 16 comprises an annular band having a radially outer portion 30 which functions as an outboard bead retaining flange when segment 16 is joined to segment 14 as shown in FIG. 2. Rim segment 16 further includes a second portion 31,32 extending radially inwardly from bead retaining flange 30 and the juncture of rim segments 14,16 at segment edge 26. In the specific embodiment of FIG. 2, band segment 16 has a cross section generally of reverse S configuration, having an outer portion forming flange 30, an intermediate portion 31 extending axially outwardly and radially inwardly from edge 26, and an inner portion 32 extending axially and radially inwardly.

Wheel 10 further comprises a hub 34 which includes a circular array of openings 36 adapted to be received over the usual wheel mounting lugs for mounting hub 34 and wheel 10 to a vehicle axle spindle in the usual manner. A circumferentially continuous cone 38 contiguous with hub 34 extends axially outwardly and is flared radially outwardly adjacent its axially outer end 40. Radially outwardly of lug openings 36, hub 34 flares axially outwardly and then inwardly to form a radially outer angulated hub portion 42.

Hub 34 is mounted centrally within rim segment 16 and rim 12 by a circumferential array 44 of wire spoke elements. In each of the wheel embodiments to be described, spoke array 44 includes separate arrays 58,60 of short and long spoke elements respectively. As best seen in FIG. 1, each array 58,60 is grouped in crossed pairs as viewed from the axial direction. Similarly, each element of the shorter spoke array 58 is angulated axially and radially outwardly between hub 34 and rim 12, while each element of the longer spoke array 60 is angulated axially inwardly between hub 34 and rim 12.

Each wire spoke element of array 60 includes a mounting nipple 46 having a self-aligning spherical or conical head 48 received in a corresponding part-spherical depression 50 in rim segment portion 32, and an internally threaded nipple body 52 extending axially from head 48 through an opening in depression 50. Each of a plurality of wire spoke bodies 54 extends through a corresponding opening in flared cone end 40 and is threadedly received within a corresponding nipple body 52, the outer surface of nipple body 52 being formed for engagement with a wrench or the like for tightening the nipple and spoke body. The inner end of the several spoke bodies 54 includes an integral head 56 which engages an interior surface on hub end 40 for retaining the spoke bodies in assembly.

Array 58 of shorter spokes includes nipples 46 received in depressions 47 on rim segment portion 31, and spoke bodies 59 extending in tension from hub portion 42 through openings 61 in rim segment portion 32 into corresponding nipples. All of the spoke elements are thus stressed in tension and function as true supporting elements in the wheel structure pursuant to the classical automotive wire spoke wheel art. A trim ring 62 is received by snap or spring fit within flange 30 for covering the nipples 48 of spoke array 58 as viewed from the outboard side of wheel 10. A tire inflation valve 64 is mounted on an outboard side wall of drop well 24 and extends axially outwardly through a corresponding opening 66 in rim segment 16.

In assembly of the wheel of FIGS. 1 and 2, rim segments 14,16 and hub 34 are first separately formed in any conventional manner. Rim segment 16 and hub 34 are then placed within a suitable fixture and the wire spoke array 44 is then assembled thereto. In assembly, each spoke body 54 is fed from within hub 34 through a corresponding opening and then threaded into the corresponding nipple 46. Most preferably, each nipple 46 is tightened onto the corresponding spoke body to a prespecified torque while the rim segment 16 and hub 34 are fixtured concentrically so that, upon removal from the fixture, the rim segment and hub remain in concentric relation.

Rim segment 14 is then joined to the preassembled combination of rim segment 16, hub 34 and spoke array 44. Most preferably, rim segment 14 is joined to the preassembled subcombination in a friction welding operation. In such an operation, rim segment 14 and the subcombination of segment 16, spokes 44 and hub 34 are separately fixtured with segments 14,16 in contact along edge 26. One of the fixtured elements is then rotated with segments 14,16 in contact so that the contact area is heated by friction. After a prespecified period, rotation is terminated and the rim segments are axially pressed together to weld the same to each other along edge 26.

A characteristic of friction welding operations herein preferred is that the material at edge 26 tends to flare or bell at the weld juncture with rim segment 16. Edge 26 is radially depressed with respect to the contiguous portion of outboard bead seat 22 as previously described so that the flared or belled metal material does not interfere with seating of the tire bead on the bead seat. Most preferably, band 28 is depressed with respect to the outer surface of bead seat 22 such that the usual ⅝ inch ball gage will firmly seat in the bead seat radius between the adjacent surfaces of bead seat 22 and flange 30. Preferably, radial concentricity between rim segment 34 and the axis of the preassembled hub, rim segment and spoke combination is maintained during the welding operation so that the entire final assembly exhibits the desired degree of concentricity and balance. As a final operation, however, the finished wheel assembly may be fixtured at bead seats 20 and 22 and the center hole of hub 34 machined to provide a pilot surface 67 as shown in FIG. 2 concentric with bead seats 20 and 22 to provide increased uniformity.

FIGS. 3-6 illustrate modified embodiments of the wheel of FIGS. 1 and 2 wherein identical parts or elements are indicated by correspondingly identical reference numerals, and similar parts or elements are indicated by corresponding reference numerals followed by the suffix "a", "b", etc. In the modified embodiment of FIG. 3, the outer portion 42a of the hub 34a extends axially and radially outwardly of the circle of lug openings 36, and receives the inner ends of the array 44a of spoke elements 60a, 58a. A ring 70 is affixed to the outboard face of hub 34a at the radius of the bolt hole openings by welding or riveting to the disc outboard face, or, less preferably, by retention using the wheel nuts (not shown). Ring 70 includes a plurality of axially extending spring fingers 72 for receiving by snap fit a suitable hub cover or medallion 74.

It will be noted with reference to FIGS. 2 and 3 that the mounting plane of hub 34 (FIG. 3) and 34a (FIG. 3), indicated by the phantom line 80 in each figure, is disposed in a radial plane generally aligned radially inwardly of outboard beam seat 22. Both of the wheels 10,10a of FIGS. 2 and 3 provide ample clearance beneath the rim base portion of rim segment 14 for clearance of a disc brake package. Thus, both of the wheels 10,10a are adapted for use on conventional front wheel drive vehicles. Furthermore, it will be apparent that the hub mounting plane 80 of each wheel design may be readily positioned axially inwardly or outwardly of that shown in FIGS. 2 and 3 by suitable modification of rim segment 16,16a and/or hub 34,34a as desired.

Figure 5:
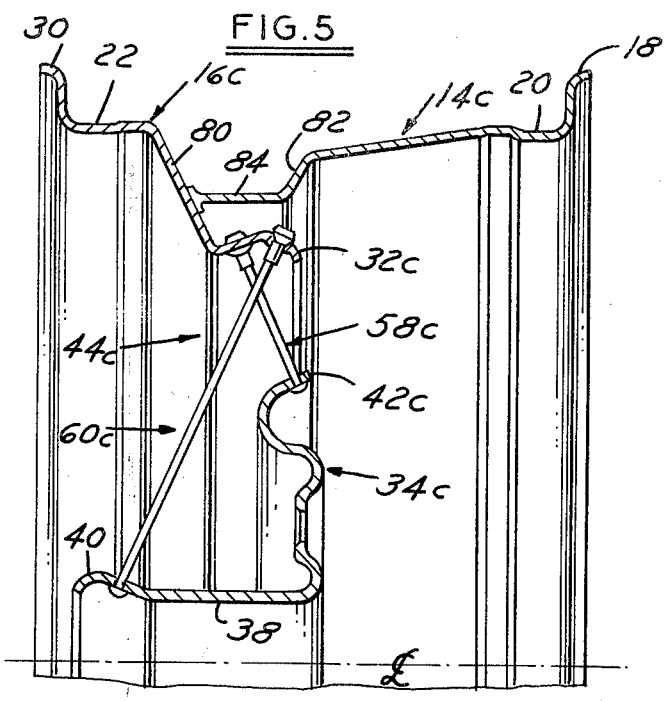
Figure 6:
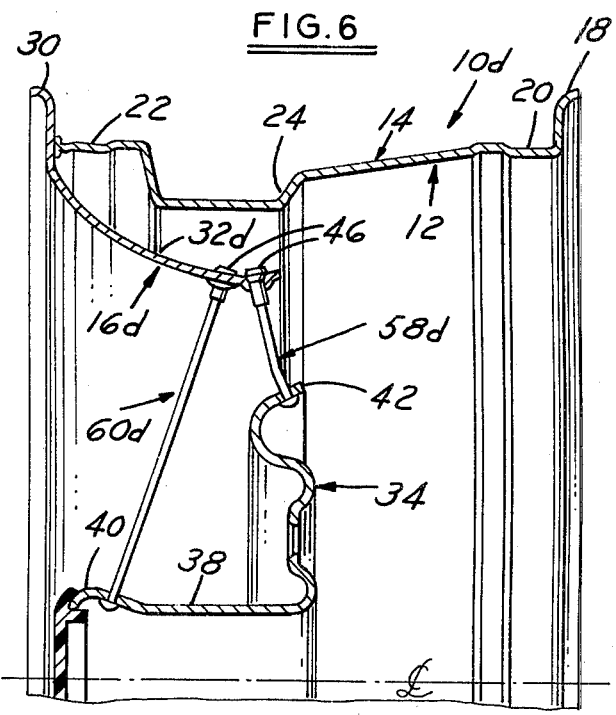

FIGS. 4-6 illustrate modified embodiments of the invention suitable for use on conventional rear wheel drive vehicles—i.e., wherein the hub mounting plane is disposed substantially centrally between the rim flanges. In the wheel 10b of FIG. 4, the second rim segment 16b includes an outer portion 30 which functions as a rim flange as previously described, and an inner portion 30b which extends both axially and radially inwardly from the juncture with rim segment 14 generally following the contour of the rim segment outboard bead seat and drop well. The hub 34b is formed as a two-piece welded structure, including a hub cone 38b for receiving the inner ends of spoke elements 60b and an outer angulated portion 42b for receiving the inner ends of spoke elements 58b. The nipples for mounting of spoke elements 58b are disposed generally beneath outboard bead seat 22, while the nipples for mounting of spoke elements 60b are disposed generally radially inwardly of drop well 24.

FIG. 5 illustrates a wire spoke wheel 10c wherein the rim segment 16c includes not only the outboard flange 30, but also outboard bead seat 22c and the outboard side wall 80 of the rim drop well 24c. Rim segment 14c includes the inboard side wall 82 of drop well 14c and the drop well base 84. Well base 84 terminates axially in the free edge 26c of rim segment 14c, which edge is friction welded to the opposing portion of rim segment 16c as previously described. The nipples 46 of both the longer and shorter spoke elements are received in a portion 32c of rim segment 16c which extends radially and axially inwardly of the rim drop well 24c. Hub 34c is substantially identical to that previously described in connection with FIGS. 1 and 2.

FIG. 6 illustrates a wire spoke wheel 10d which features a hub 34 substantially identical to hub 34c as shown in FIGS. 2 and 5, and a rim segment 16d welded to rim segment 14 outboardly adjacent outboard bead seat 22 and extending both radially and axially inwardly therefrom to receive the spoke mounting nipples generally radially inwardly of rim drop well 24.

Among the several advantages of the various embodiments of the invention described above, it will be noted that a true wire wheel construction is provided rather than one simulated by a wire spoke wheel cover or other non-functional wire spoke appendages embodied in a disc-type wheel. Thus, the usual problems attendant to wheel covers, namely, loss by theft and accident, and noise from rattling and stones, are eliminated. Moreover, a more "genuine" wire wheel styling may be achieved.

In addition, the two-part rim construction generic to the various embodiments, particularly when joinder is achieved by the above-described friction welding technique, insures against air leakage from a tubeless tire mounted on the rim. In this connection, it will be noted that there are no spoke holes in the air sealing portions of the two-part rim, and hence no air leakage problems arise from this source. It is also to be noted that the subassembly of the hub, spokes and outboard rim segment enables the same to be fixtured with ready access for assembly of the short and long spoke arrays by either hand or automatic machinery. Further fixturing of this sub-assembly relative to the inboard rim segment 14 in the subsequent friction welding stage also enables greater concentricity to be achieved between the rim and hub elements of the wheel. After final assembly, the nipples 46 remain accessible for hand tool adjustment and replacement in the field, should such servicing be required.

The invention claimed is:

1. A method of manufacturing a wire spoke wheel for pneumatic tubeless tires comprising the steps of:
   (a) forming a wheel rim segment comprising a rim base having an integral first bead retaining flange at one end and a circular base edge at the opposing end,
   (b) separately forming a circumferential band which includes an inner portion and a radially outer portion adapted to function as a bead retaining flange,
   (c) separately forming a center hub including openings for mounting the wheel to vehicle,
   (d) mounting said hub within band by assembling a plurality of wire spoke means between said radially inner portion of said band and said hub with said hub and band fixtured in coaxial relation, and then
   (e) permanently securing said rim segment to said band by welding said band to said circular edge entirely around said edge between said inner and outer portions of said band with said rim segment and the band/hub/spoke subassembly resulting from said step (d) fixtured in coaxial relation, such that said radially outer portion of said band is disposed to function as a second bead retaining flange on said rim segment, and said radially inner portion of said band with said wire spoke means assembled thereto is disposed radially inwardly of said rim segment.

2. The method set forth in claim 1 wherein said step (e) is carried out in a friction welding operation by:
   (e1) fixturing said band/hub/spoke subassembly resulting from said step (d) and said rim segment on a common axis,
   (e2) rotating one of said band/hub/spoke subassembly and said rim segment with respect to the other about said common axis with said rim edge in contact with said band between said inner and outer portions,
   (e3) terminating said rotation in step (e2) after a predetermined time period, and then
   (e4) axially pressing said rim segment and band together.

3. The method set forth in claim 1 or 2 wherein said step (a) comprises the step of forming said rim segment to include a rim base with inboard and outboard bead seats separated by a rim drop well, with said integral first bead retaining flange projecting from said inboard bead seat and with said outboard bead seat terminating in said circular edge.

4. The method set forth in claim 3 wherein said step (c) includes the step of forming an inboard portion of said hub so as to define a mounting abutment plane, and wherein said step (d) includes the step of assembling said wire spoke means to said band and said hub such that said band, said hub and said wire spoke means are disposed entirely outboard of said plane.

5. A wire spoke vehicle wheel comprising a rim including a first rim section having a bead seat, a first bead retaining flange integral with said bead seat and a rim base portion projecting from said bead seat and terminating in a circular edge, a second rim section welded to said first rim section entirely around said edge with an outer portion of said second rim section projecting radially outwardly from said edge to form a second bead retaining flange on said rim and an inner portion of said second rim section projecting radially inwardly from said edge and being spaced radially inwardly of said first rim section; a hub structurally separate from said rim and including means for mounting the wheel to a vehicle; and a plurality of wire spoke elements adjustably secured at one end to said inner portion of said second rim section by a plurality of nipples and secured at an opposing end to said hub, with said hub being mounted by said wire spoke means and said nipples coaxially within said rim.

6. The wheel set forth in claim 5 wherein said first rim section integrally includes an inboard bead retaining flange, an inboard tire bead seat and a portion of a rim drop well comprising an inboard well side wall and a well base, with an outboard edge of said well base defining said circular edge, and whereby said outer portion of said second rim segment includes an outboard well side wall, an outboard bead seat and said outboard bead retaining flange.

7. The wheel set forth in claim 5 wherein said first rim section integrally includes a pair of axially spaced bead seats, one of said bead seats being contiguous with said first bead retaining flange and the other of said bead seats terminating in said circular edge.

8. The wheel set forth in claim 7 wherein said first bead retaining flange comprises an inboard bead retaining flange.

9. The wheel set forth in claim 8 specifically adapted for use on a front wheel drive vehicle wherein said inner portion of said second rim section, said wire spoke means and said hub are disposed generally radially inwardly of said outer portion of said second rim section so as to provide clearance for a disc brake package radially inwardly of said rim.

10. The wheel set forth in claim 5, 6 or 7 wherein said first rim segment is friction welded to said second rim segment.

11. The wheel set forth in claim 5 wherein said wire spoke means comprise inboard and outboard arrays of spoke elements disposed in circumferential pairs, with each element of each said pair crossing the other element of said pair as viewed from a direction axially of said wheel, and with each pair of said inboard array crossing a corresponding pair in said outboard array as viewed in cross section radially of said wheel.

12. The wheel set forth in claim 5 wherein said hub including said means for mounting to a vehicle defines a mounting abutment plane inboard of said hub and perpendicular to the wheel axis, and wherein said second rim section, said hub and said spoke elements are disposed entirely outboard of said plane such that said wheel is adapted for use on a front wheel drive vehicle.

* * * * *